(12) United States Patent
Kawamura et al.

(10) Patent No.: US 11,274,179 B2
(45) Date of Patent: Mar. 15, 2022

(54) METHOD FOR PRODUCING COMPOUND HAVING AMIDE BOND AND ALSO HAVING ALKOXYSILYL GROUP

(71) Applicant: CANON KABUSHIKI KAISHA, Tokyo (JP)

(72) Inventors: Masashi Kawamura, Yokohama (JP); Kenji Ookubo, Numazu (JP); Takayuki Toyoda, Suntou-gun (JP); Taku Shimoda, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 16/851,261

(22) Filed: Apr. 17, 2020

(65) Prior Publication Data

US 2020/0339744 A1 Oct. 29, 2020

(30) Foreign Application Priority Data

Apr. 25, 2019 (JP) .............................. JP2019-083949

(51) Int. Cl.
   *C08G 63/85* (2006.01)
   *C08G 63/91* (2006.01)
   *C08G 63/672* (2006.01)

(52) U.S. Cl.
   CPC ......... *C08G 63/916* (2013.01); *C08G 63/672* (2013.01); *C08G 63/85* (2013.01)

(58) Field of Classification Search
   CPC .... C08G 63/916; C08G 63/85; C08G 63/672; C08G 63/6854; C08G 63/6954; C08G 63/668; C08G 63/91; C08G 63/68; C08G 63/695; C08G 63/914
   See application file for complete search history.

(56) References Cited

U.S. PATENT DOCUMENTS

| 10,113,072 B2 | 10/2018 | Inoue et al. |
| 10,597,541 B2 | 3/2020 | Inoue et al. |
| 2004/0048998 A1* | 3/2004 | Klein ................ C08F 8/42 528/25 |

FOREIGN PATENT DOCUMENTS

| CN | 103881107 A | 6/2014 |
| JP | 2015-140397 A | 8/2015 |
| JP | 2017-058598 A | 3/2017 |

OTHER PUBLICATIONS

Kunishima et al.; Tetrahedron, 1999, vol. 55, p. 13159-13170.*
GCC; CHM 130LL: pH, Buffers, and Indicators, 2017, p. 1-5.*
Rydergren; Chemical Modifications of Hyaluronan using DMTMM-Activated Amidation, 2013, p. 1-35.*
D'Este et al.; Carbohydrate Polymers, 2014, vol. 108, p. 239-246.*
F.D. Osterholtz et al., "Kinetics of the Hydrolysis and Condensation of Organofunctional Alkoxysilanes: A Review," 6(1) J. Adhesion Sci. Technol. 127-149 (1992).

* cited by examiner

Primary Examiner — Robert S Jones, Jr.
(74) Attorney, Agent, or Firm — Venable LLP

(57) ABSTRACT

A production method for obtaining a compound having an amide bond and also having an alkoxysilyl group by a reaction of a compound including a carboxy group with a compound having an amino group and an alkoxysilyl group, the production method comprising:

a step of conducting the reaction using a triazine-based amidating agent and under a basic condition.

8 Claims, No Drawings

METHOD FOR PRODUCING COMPOUND HAVING AMIDE BOND AND ALSO HAVING ALKOXYSILYL GROUP

BACKGROUND OF THE INVENTION

Field of the Invention

The present invention relates to a method for producing a compound having an amide bond and also having an alkoxysilyl group.

Description of the Related Art

Silane compounds typified by silane coupling agents and the like are widely used as adhesives at the interface between an organic material and an inorganic material.

The chemical structure of a silane compound generally includes an organic functional group including carbon and hydrogen and an inorganic functional group including silicon. The organic functional group has high affinity with organic materials such as rubber, resin and the like, and the inorganic functional group has high affinity with inorganic materials such as glass, metals and the like. Therefore, by using a silane compound, an organic material and an inorganic material, which are usually difficult to bond to each other, can be strongly bonded.

Among the silane compounds, a silane modified compound having an amide bond is a preferable material because it ensures stronger bonding, and various production examples thereof are known.

Chinese Patent Application Publication No. 103881107 discloses a method for producing a silane modified compound having an amide bond by using N,N-dicyclohexylcarbodiimide (DCC) as an amidating agent and performing an amidation reaction between propiolic acid and 3-aminopropyltriethoxysilane in methylene chloride.

Japanese Patent Application Publication No. 2017-58598 discloses a method for producing a silane modified compound having an amide bond by using 1-ethyl-3-(3-dimethylaminopropyl) carbodiimide hydrochloride (EDC) as an amidating agent and performing an amidation reaction between 4-tert-butylbenzoic acid and 3-aminopropyltrimethoxysilane in methylene chloride to which N, N-dimethyl-4-aminopyridine has been added.

Japanese Patent Application Publication No. 2015-140397 discloses a method for producing a silane modified compound having an amide bond by using a triazine-based amidating agent (DMT-MM) as an amidating agent and performing an amidation reaction between a compound including an iniferter and a carboxy group and 3-aminopropyltriethoxysilane in ethanol.

SUMMARY OF THE INVENTION

According to the methods described in the specification of Chinese Patent Application Publication No. 103881107 and Japanese Patent Application Publication No. 2017-58598, side reactions other than the amidation reaction are likely to occur during the production of the silane modified compound. Specifically, carbodiimide which is an amidating agent produces N-acylurea.

Generally, where carbodiimide is added in a large amount to obtain a sufficient reaction efficiency, N-acylurea is likely to be generated. In addition, this side reaction remarkably occurs in a polar solvent such as water, alcohol, N,N-dimethylacetamide, and the like.

As a result, it was found that the yield of the silane modified compound having an amide bond was reduced.

Meanwhile, according to the method described in Japanese Patent Application Publication No. 2015-140397, a high-purity silane modified compound having an amide bond can be obtained using a triazine-based amidating agent (DMT-MM). However, polymer compounds such as polyester and styrene acrylic resin have low solubility in polar solvents such as alcohol, water and the like, so that the concentration during the reaction cannot be increased.

As a result, it was found that although the purity was high, a sufficient amount of the silane modified compound could not be obtained.

Also, among silane modified compounds having an amide bond, compounds having an alkoxysilyl group have extremely excellent adhesive ability due to the reactivity of the alkoxysilyl group with an inorganic material.

However, it has been found that in the method described in the abovementioned patent literature, a hydrolysis reaction of the alkoxysilyl group occurs during the production of the silane modified compound, and the alkoxysilyl group cannot be retained.

The cause is thought to be the hydrolysis rate of the alkoxysilyl group. Thus, the hydrolysis rate of the alkoxysilyl group is at a minimum close to pH 7 and increases when the pH changes to acidic or basic side (this is described in detail in Journal of Adhesion Science and Technology, Volume 6, Issue 1 (1992), Pages 127-149).

Thus, various methods for producing a silane modified compound having an amide bond have been proposed, but there are problems to be solved in order to obtain a compound having an amide bond and also having an alkoxysilyl group in a high yield by reacting a compound including a carboxy group and a compound having an amino group and an alkoxysilyl group.

That is, an object of the present invention is to provide a production method for obtaining a compound having an amide bond and also having an alkoxysilyl group in a high yield while preventing side reactions and hydrolysis.

A production method for obtaining a compound having an amide bond and also having an alkoxysilyl group by a reaction of a compound including a carboxy group with a compound having an amino group and an alkoxysilyl group, the production method comprising:

a step of conducting the reaction using a triazine-based amidating agent and under a basic condition.

The present invention can provide a production method for obtaining a compound having an amide bond and also having an alkoxysilyl group in a high yield while preventing side reactions and hydrolysis.

Further features of the present invention will become apparent from the following description of exemplary embodiments.

DESCRIPTION OF THE EMBODIMENTS

Unless specifically indicated otherwise, the expressions "from XX to YY" and "XX to YY" that show numerical value ranges refer to numerical value ranges that include the lower limit and upper limit that are the end points.

Based on the results of the comprehensive study conducted to solve the above problems, the present inventors have found that side reactions and hydrolysis can be prevented and a compound having an amide bond and also having an alkoxysilyl group (hereinafter, may be referred to as "silane modified compound having an amide bond") can be obtained in a high yield by the following method.

Specifically, provided is a production method for obtaining a compound having an amide bond and also having an alkoxysilyl group by a reaction of a compound including a carboxy group with a compound having an amino group and an alkoxysilyl group, the method including a step of conducting the reaction using a triazine-based amidating agent under a basic condition.

The following detailed mechanism is presumed.

First, the reaction in the present invention proceeds by a two-stage reaction mechanism as shown in the following scheme. In the first-stage reaction, the carboxylic acid in the compound including a carboxy group is added to the triazino group to give an active ester intermediate. In the next, second-stage reaction, the amino group in the compound having an amino group and an alkoxysilyl group participates in a nucleophilic addition reaction with the carbonyl group of the active ester intermediate, thereby yielding a compound having an amide bond and also having an alkoxysilyl group (hereinafter, may be referred to as "silane modified compound having an amide bond").

First-Stage Reaction

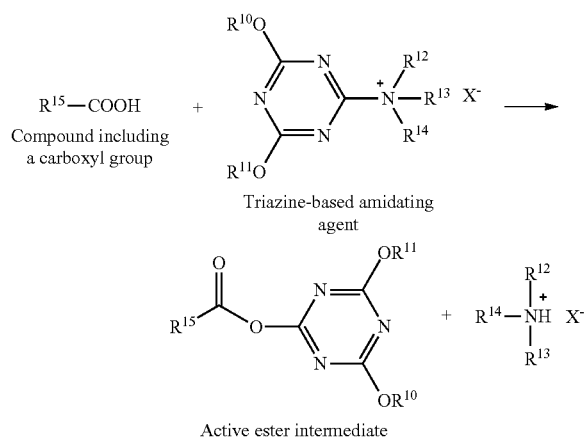

Second-Stage Reaction

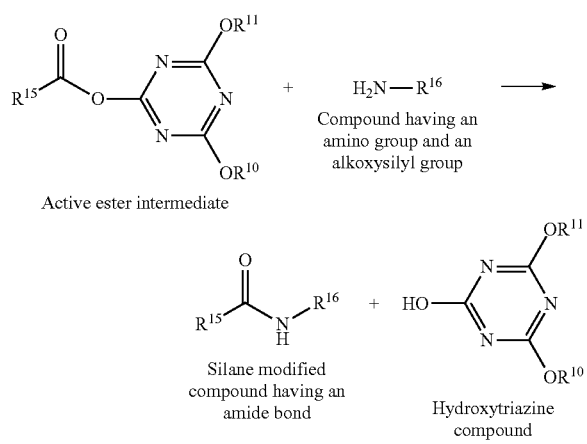

In the scheme, $R^{15}$ represents an organic group; $R^{10}$ to $R^{14}$ and X have the same meanings as $R^{10}$ to $R^{14}$ and X in the formula (4) described below; and $R^{16}$ represents an organic group including an alkoxysilyl group.

The amidation reaction between a compound including a carboxy group and a compound having an amino group and an alkoxysilyl group is caused by the nucleophilicity of the carboxy group and the electrophilicity of the triazine-based amidating agent. By increasing the electrophilicity and nucleophilicity, the reaction rate is improved.

By setting the reaction environment to basic conditions, the carboxy group in the compound including a carboxy group is deprotonated and becomes an anion, whereby the nucleophilicity can be increased. Meanwhile, since the N atom of the triazine-based amidating agent is a tetraalkylated quaternary ammonium cation, high electrophilicity can be maintained.

Therefore, the reaction rate is improved by the carboxy group having increased nucleophilicity and the triazine-based amidating agent maintaining high electrophilicity, and as a result, side reactions can be prevented.

Further, as the reaction proceeds, a hydroxytriazine compound is generated as a by-product from a triazine-based condensing agent. It is conceivable that the hydroxytriazine compound interacts with the alkoxysilyl group of the silane modified compound and acts as a protective group, thereby making it possible to prevent hydrolysis under basic conditions that conventionally advanced the hydrolysis.

As described above, by reacting a compound including a carboxy group and a compound having an amino group and an alkoxysilyl group under basic conditions by using a triazine-based amidating agent, side reactions and hydrolysis are both prevented, and a silane modified compound including an amide bond can be obtained in a high yield.

Hereinafter, the constitution requirements of the present invention will be described in detail.

Production Method

The amidation reaction for obtaining a silane modified compound having an amide bond can be performed without a solvent as long as the compound including a carboxy group and the compound having an amino group and an alkoxysilyl group are well mixed. However, it is preferable to carry out the reaction in the presence of a solvent in order to prevent rapid progress of the reaction.

In order to prevent volatilization of the materials due to heating, the reaction temperature in the amidation reaction is preferably from 0° C. to 100° C., and more preferably from 0° C. to 50° C.

Regarding the reaction time in the amidation reaction, the reaction is generally completed within 3 h, and often completed within 1 day at the latest. The reaction time may be determined by measuring the reduction amount of the compound having an amino group and an alkoxysilyl group in the reaction system until the reduction amount stops changing over time. The specific measurement method may be such as described in "Method for Measuring Amidation Reaction Rate" hereinbelow.

After completion of the amidation reaction, the product may be used as it is, but it is preferable to add a purification operation in order to enhance the stability of the alkoxysilyl group. An ordinary method for isolating organic compounds can be adopted as the purification operation, and specific examples thereof include a recrystallization method and a reprecipitation method using an organic solvent, and column chromatography or the like using silica gel and the like. These methods may be used singly or in combination of two or more to perform purification, thereby making it possible to obtain a high-purity silane modified compound including an amide bond.

Basic Condition

The basic condition specifically means that the pH of a reaction system solution when mixed with water is from 7.1 to 14.0, but from the viewpoint of preventing side reactions and hydrolysis, it is preferable that pH be from 8.0 to 13.0. From the viewpoint of production stability, in addition to the viewpoint of preventing side reactions and hydrolysis, it is preferable that pH be from 9.0 to 12.0.

In a reaction between a compound including a carboxy group and a compound having an amino group and an alkoxysilyl group which is conducted using a triazine-based amidating agent, the time for performing the reaction under the basic condition is preferably 80% or more, more preferably 90% or more, even more preferably 95% or more, and most preferably 100% of the total time.

In the method for adjusting to the basic condition, it is preferable to mix a basic substance in the reaction system. Examples of the basic substance include various organic bases and inorganic bases.

These organic bases and inorganic bases may be used alone or in combination of a plurality thereof as long as the amidation reaction between the compound including a carboxy group and the compound having an amino group and an alkoxysilyl group is not inhibited. Further, the concentration of the base used in the reaction solution may be adjusted so as to obtain the aforementioned pH range.

Examples of the organic base are listed hereinbelow.

Aliphatic tertiary amines such as trimethylamine, triethylamine, tripropylamine, tributylamine, trihexylamine, trioctylamine, dimethylpropylamine, dimethylbutylamine, dimethylhexylamine, dimethyloctylamine, dimethyllaurylamine, diethylbutylamine, diethylhexylamine, di ethyloctylamine, diisopropylethylamine, methyldioctylamine, triethanolamine, N-methyldiethanolamine, N-ethyldiethanolamine, dimethylethanolamine, N,N-dibutylmethanolamine, 2-dimethylethanolamine, N,N-dibutylethanolamine, di(2-ethylhexyl)methanolamine, ethyldiethanolamine, butyldiethanolamine, triallylamine, and the like;

aliphatic secondary amines such as dimethylamine, diethylamine, diisobutylamine, di(2-ethylhexyl) amine, diisobutylamine, dioctylamine, aminoethylethanolamine, diethanolamine, N-methyl ethanolamine, triethylenetetramine, methoxy(methyl)amine, and the like;

aliphatic primary amines such as methylamine, ethylamine, butylamine, hexylamine, octylamine, di-n-amylamine, isophoronediamine, 2-aminoethanol, 1,3-propanediamine, 1,4-butanediamine (putrescine), 1,6-hexanediamine, 2-ethylhexylamine, 3-(2-ethylhexyloxy)propylamine, 3-lauryloxypropylamine, octadecylamine, and the like;

cycloalkyl group-containing aliphatic amines and aromatic-containing aliphatic amines such as dicyclohexylamine, tricyclohexylamine, benzylamine, dibenzylamine, N,N'-dimethylbenzylamine, N,N'-diethylbenzylamine, N,N'-methylethylbenzylamine, N,N'-methylbutylbenzylamine, 2-hydroxybenzylamine, triphenylamine, tri(methylphenyl)amine, tri(butylphenyl)amine, diphenylethylamine, diphenylbutylamine bis(methylphenyl)methylamine, and the like;

cyclic (aromatic or aliphatic) amines such as 1,8-bis(dimethylamino)naphthalene (trade name: PROTON SPONGE), quinuclidine(1-azabicyclo[2.2.2]octane), triethylenediamine(1,4-diazabicyclo[2.2.2]octane, DABCO), pyrrolidine, N-methylpyrrolidine, piperidine, N-methylpiperidine, N-dimethylpiperazine, 1-(2-hydroxyethyl)piperazine, morpholine, 4-(2-hydroxyethyl)morpholine, pyridine, 4-aminopyridine, 4-dimethylaminopyridine (DMAP), 3-hydroxypyridine, 2,4,6-trimethylpyridine, N-cyclohexylpyridine, 1,2-dimethyl-1,4,5,6-tetrahydropyrimidine, 1,4,7,10-tetraazacyclododecane, 1,5,9,13-tetraazacyclotridecane, and the like;

amidines of heterocyclic compounds such as diazabicyclononene(1,5-diazabicyclo[4.3.0]non-5-ene, DBN), diazabicycloundecene(1,8-diazabicyclo[5.4.0]undec-7-ene, DBU) and 6-dibutylamino-1,8-diazabicyclo[5.4.0]undec-7-ene (DBA-DBU), and the like;

guanidines of heterocyclic compounds such as guanidine, tetramethylguanidine (TMG), butylguanidine, diphenylguanidine (DPG), 7-methyl-1,5,7-triazabicyclodec-5-ene (7-methyl-1,5,7-triazabicyclo[4.4.0]dec-5-ene, MTBD), 1,5,7-triazabicyclodec-5-ene (1,5,7-triazabicyclo[4.4.0]dec-5-ene, TBD), and the like; and organic phosphazenes such as 2-tert-butylimino-2-diethylamino-1,3-dimethyl-perhydro-1,3,2-diazaphosphorin (BEMP), and the like.

Examples of the inorganic base are listed hereinbelow.

Hydroxides of alkali metals such as lithium hydroxide, sodium hydroxide, potassium hydroxide, and the like and aqueous solutions thereof; hydroxides of alkaline earth metals such as magnesium hydroxide, calcium hydroxide, strontium hydroxide, barium hydroxide, and the like and aqueous solutions thereof; carbonates of alkali metals such as lithium carbonate, sodium carbonate, sodium bicarbonate, potassium carbonate, potassium bicarbonate, and the like and aqueous solutions thereof; carbonates of alkaline earth metals such as magnesium carbonate, calcium carbonate, strontium carbonate, barium carbonate, and the like and aqueous solutions thereof; phosphates of alkali metals such as lithium phosphate, trisodium phosphate, disodium hydrogenphosphate, tripotassium phosphate, dipotassium hydrogenphosphate, and the like and aqueous solutions thereof; phosphates of alkaline earth metals such as magnesium phosphate, calcium phosphate, strontium phosphate, barium phosphate, and the like and aqueous solutions thereof; basic amino acids such as histidine, arginine, lysine, and the like and aqueous solutions thereof; trishydroxymethylaminomethane and aqueous solution thereof; and aqueous ammonia.

Among the above, from the viewpoint of solubility in organic solvents, it is preferable to select an organic base.

It is preferable to use a tertiary amine in order to efficiently perform the amidation reaction between the compound including a carboxy group and the compound having an amino group and an alkoxysilyl group. That is, the reaction between the compound including a carboxy group and the compound having an amino group and an alkoxysilyl group is preferably conducted in the presence of a tertiary amine.

From the viewpoint of preventing hydrolysis and preventing side reactions, it is preferable that the tertiary amine be at least one compound selected from the group consisting of trimethylamine, triethylamine, tripropylamine, diisopropylethylamine, triethanolamine, N-methyldiethanolamine, N-ethyldiethanolamine, dimethylethanolamine, triphenylamine, pyridine, and 4-dimethylaminopyridine (DMAP).

Among these, from the viewpoint of achieving a high degree of prevention of both hydrolysis and side reactions, it is more preferable to select at least one from the group consisting of triethylamine, 4-dimethylaminopyridine (DMAP), triethanolamine and diisopropylethylamine.

Triazine-based Amidating Agent

Examples of the triazine-based amidating agent include compounds represented by the following general formula (4).

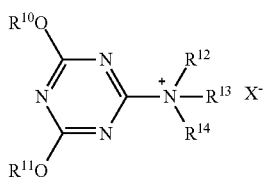

(4)

In the formula (4), $R^{10}$ and $R^{11}$ each independently represent an alkyl group having 1 to 4 carbon atoms or an aryl group having 6 to 8 carbon atoms; one of $R^{12}$, $R^{13}$, and $R^{14}$ represents an alkyl group having 1 to 4 carbon atoms, and the remaining two together with the nitrogen atom to which they are bonded form a 5- or 6-membered ring; and X represents a halogen atom.

The alkyl group having 1 to 4 carbon atoms in $R^{10}$ and $R^{11}$ can be exemplified by a methyl group, an ethyl group, an n-propyl group, an isopropyl group, an n-butyl group, an isobutyl group, a sec-butyl group, a tert-butyl group and the like.

The aryl group having 6 to 8 carbon atoms in $R^{10}$ and $R^{11}$ can be exemplified by a phenyl group, a toluyl group, a xylyl group and the like.

$R^{10}$ and $R^{11}$ are preferably an alkyl group having 1 to 4 carbon atoms, and more preferably a methyl group.

One of $R^{12}$, $R^{13}$ and $R^{14}$ is an alkyl group having 1 to 4 carbon atoms, for example, a methyl group, an ethyl group, an n-propyl group, an isopropyl group, an n-butyl group, an isobutyl group, a sec-butyl group, and a tert-butyl group, and among them, a methyl group is preferable.

The remaining two of $R^{12}$, $R^{13}$, and $R^{14}$ together with the nitrogen atom to which they are bonded form a 5- or 6-membered ring. Examples of the 5-membered ring and the 6-membered ring include a pyrrolidinyl group, a piperidinyl group, a morpholino group, and a thiomorpholino group, and among them, a morpholino group is preferable.

These rings may be substituted with an alkyl group having 1 to 4 carbon atoms (a methyl group, an ethyl group, an n-propyl group, an isopropyl group, an n-butyl group, an isobutyl group, a sec-butyl group, and a tert-butyl group).

X is a halogen atom, for example, a fluorine atom, a chlorine atom, and a bromine atom, and among them, a chlorine atom is preferable.

From the viewpoint of the reactivity of the amidation reaction and cost-efficiency, 4-(4,6-dimethoxy-1,3,5-triazin-2-yl)-4-methylmorpholinium chloride (DMT-MM) represented by the following formula (5) is preferable as the triazine-based amidating agent of the formula (4). In the formula, Me is a methyl group.

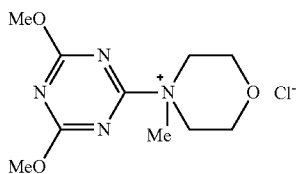

(5)

The amount of the triazine-based amidating agent used is preferably 0.1 parts by mass or more based on 100.0 parts by mass of the compound including a carboxy group, and more preferably 0.2 parts by mass or more from the viewpoint of improving the reactivity. Meanwhile, from the viewpoint of cost-efficiency, this amount is preferably 100.0 parts by mass or less, and more preferably 50.0 parts by mass or less.

Reaction Solvent

In order to efficiently advance the amidation reaction, it is preferable that an aprotic polar solvent be used as the solvent to be used in the amidation reaction. The reason is that the aprotic polar solvent has a high affinity for the compound including a carboxy group, the compound including an amino group and an alkoxysilyl group, and the triazine-based amidating agent.

Examples of the aprotic polar solvent include, but are not limited to, N-methylformamide, N,N-dimethylformamide, N-ethylformamide, N,N-diethylformamide, N-methylacetamide, N,N-dimethylacetamide, N-ethylacetamide, N,N-diethylacetamide, hexamethylphosphoramide, sulfolane, 3-methylsulfolane, 2,4-dimethyl sulfolane, dimethyl sulfone, ethylmethylsulfone, ethylisopropylsulfone, N-methyl-2-pyrrolidone, ethylene carbonate, propylene carbonate, isobutylene carbonate, acetonitrile and the like, dimethyl sulfoxide and the like, 1,3-dimethyl-2-imidazolidinone, 1,3-diethyl-2-imidazolidinone, 1,3-di(n-propyl)-2-imidazolidinone, 1,3,4-trimethyl-2-imidazolidinone, tetrahydrofuran, acetone, 1,4-dioxane, γ-butyrolactone, γ-valerolactone, 1,1,1,3,3,3-hexafluoro-2-propanol (HFIP), ethyl acetate and the like.

Among these, where the compound including a carboxy group is a polymer, from the viewpoint of improving the solubility of the polymer, it is preferable to select from N,N-dimethylformamide, N,N-dimethylacetamide, acetone, tetrahydrofuran, N-methyl-2-pyrrolidone, dimethyl sulfoxide, ethyl acetate, and the like.

Further, where the polymer is a polyester, from the viewpoint of improving the solubility of the polyester, it is more preferable to use N, N-dimethylformamide, N, N-dimethylacetamide, acetone, tetrahydrofuran, N-methyl-2-pyrrolidone and the like.

Compound Including Carboxy Group

The compound including a carboxy group is not particularly limited as long as it includes one or a plurality of carboxy groups in the molecule, and may be a polymer or a low-molecular compound.

The concentration of the compound including a carboxy group in the reaction solution is preferably made higher to reduce the amount of waste solvent, and specifically, is preferably within a range from 10.0% by mass to 50.0% by mass.

Where the compound including a carboxy group is a polymer, from the viewpoints of affinity for a solvent and reactivity, the weight average molecular weight (Mw) is preferably from 3000 to 100000, and more preferably from 5000 to 50000.

The acid value mg KOH/g of the compound including a carboxy group is preferably from 1.0 to 100.0, and more preferably from 3.0 to 30.0.

There is a greater problem with respect to yield when the compound including a carboxy group is a polymer than when it is a low-molecular compound. That is, even if a side reaction or hydrolysis occurs, where the compound including a carboxy group is a low-molecular compound as in the above-mentioned patent literature, the desired product can be obtained by various purification methods such as column chromatography, recrystallization, and the like, although the yield can be reduced.

Meanwhile, where the compound including a carboxy group is a polymer, a segment amidated by the reaction and a segment where a side reaction has occurred are often mixed in the same molecule. It has been found that in this case, it is impossible to purify the compound as in the case of a low-molecular compound, and the yield may be significantly reduced.

Where the compound including a carboxy group is a polymer, the type of the polymer is not particularly limited and can be exemplified by polyester resins, vinyl resins, styrene acrylic resins, polyurethane resins, polycarbonate resins, phenol resins, polyolefin resins, and the like.

It is preferable that the compound including a carboxy group include a polyester resin or a vinyl resin. For example, a hybrid resin of a polyester resin and a vinyl resin may be used. More preferably, the compound including a carboxy group is a polyester resin or a vinyl resin.

The polyester resin is not particularly limited, but is preferably a polycondensate of a dialcohol and a dicarboxylic acid. For example, a polyester resin having a structure represented by the following formula (6) and at least one structure (a plurality of structures can be selected) selected from the group consisting of structures represented by the following formulas (7) to (9) is preferred. Another example is a polyester resin having a structure represented by the following formula (10).

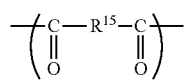  (6)

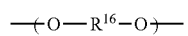  (7)

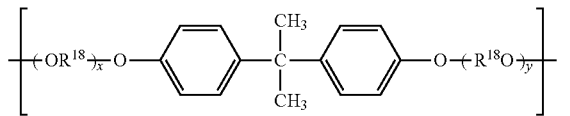  (8)

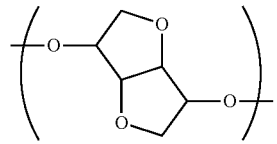  (9)

$$\left(\!\!\begin{array}{c}\text{C}-\text{R}^{17}-\text{O}\\ \|\\ \text{O}\end{array}\!\!\right)$$  (10)

Where, $R^{15}$ in the formula (6) represents an alkylene group, an alkenylene group, or an arylene group; $R^{16}$ in the formula (7) represents an alkylene group or a phenylene group; $R^{18}$ in the formula (8) each independently represents an ethylene group or a propylene group, x and y are each an integer of 0 or more, and the average value of x+y is from 2 to 10; $R^{17}$ in the formula (10) represents an alkylene group or an alkenylene group.

Examples of the alkylene group (preferably having from 1 to 12 carbon atoms) for $R^{15}$ in the formula (6) include a methylene group, an ethylene group, a trimethylene group, a propylene group, a tetramethylene group, a hexamethylene group, a neopentylene group, a heptamethylene group, an octamethylene group, a nonamethylene group, a decamethylene group, an undecamethylene group, a dodecamethylene group, and 1,3-cyclopentylene, 1,3-cyclohexylene, and 1,4-cyclohexylene groups.

Examples of the alkenylene group (preferably having from 1 to 4 carbon atoms) for $R^{15}$ in the formula (6) include a vinylene group, a propenylene group and a 2-butenylene group.

Examples of the arylene group (preferably having from 6 to 12 carbon atoms) for $R^{15}$ in the formula (6) include a 1,4-phenylene group, a 1,3-phenylene group, a 1,2-phenylene group, a 2,6-naphthylene group, a 2,7-naphthylene group and a 4,4'-biphenylene group.

$R^{15}$ in the formula (6) may be substituted with a substituent. In this case, examples of the substituent include a methyl group, a halogen atom, a carboxy group, a trifluoromethyl group, and a combination thereof.

Examples of the alkylene group (preferably having from 1 to 12 carbon atoms) for $R^{16}$ in the formula (7) include a methylene group, an ethylene group, a trimethylene group, a propylene group, a tetramethylene group, a hexamethylene group, a neopentylene group, a heptamethylene group, an octamethylene group, a nonamethylene group, a decamethylene group, an undecamethylene group, a dodecamethylene group, and 1,3-cyclopentylene, 1,3-cyclohexylene, and 1,4-cyclohexylene groups.

Examples of the phenylene group for $R^{16}$ in the formula (7) include a 1,4-phenylene group, a 1,3-phenylene group, and a 1,2-phenylene group.

$R^{16}$ in the formula (7) may be substituted with a substituent. In this case, examples of the substituent include a methyl group, an alkoxy group, a hydroxy group, a halogen atom, and a combination thereof.

Examples of the alkylene group (preferably having from 1 to 12 carbon atoms) for $R^{17}$ in the formula (10) include a methylene group, an ethylene group, a trimethylene group, a propylene group, a tetramethylene group, a hexamethylene group, a neopentylene group, a heptamethylene group, an octamethylene group, a nonamethylene group, a decamethylene group, an undecamethylene group, a dodecamethylene group, and a 1,4-cyclohexylene group.

Examples of the alkenylene group (preferably having from 1 to 40 carbon atoms) for $R^{17}$ in the formula (10) include a vinylene group, a propenylene group, a butenylene group, a butadienylene group, a pentenylene group, a hexenylene group, a hexadienylene group, a heptenylene group, an octanylene group, a decenylene group, an octadecenylene group, an eicosenylene group, and a triacontenylene group. These alkenylene groups may have any of a linear, branched and cyclic structure. Further, the double bond may be at any position, as long as there is at least one double bond.

$R^{17}$ in the formula (10) may be substituted with a substituent. In this case, examples of the substituent that may be used for substitution include an alkyl group, an alkoxy group, a hydroxy group, a halogen atom, and a combination thereof.

The vinyl resin is not particularly limited, and a known resin can be used. For example, the following monomers can be used.

Styrene-based monomers such as styrene and derivatives thereof such as o-methylstyrene, m-methyl styrene, p-methyl styrene, p-methoxystyrene, p-phenyl styrene, p-chlorostyrene, 3,4-dichlorostyrene, p-ethyl styrene, 2,4-dimethyl styrene, p-n-butylstyrene, p-tert-butyl styrene, p-n-hexyl styrene, p-n-octylstyrene, p-n-nonylstyrene, p-n-decylstyrene, and p-n-dodecylstyrene.

Acrylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate.

Methacrylic acid esters such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate.

Amino group-containing α-methylene aliphatic monocarboxylic acid esters such as dimethylaminoethyl methacrylate and diethylaminoethyl methacrylate; and vinyl monomers including a nitrogen atom such as acrylic acid or methacrylic acid derivatives such as acrylonitrile, methacrylonitrile and acrylamide.

Unsaturated dibasic acids such as maleic acid, citraconic acid, itaconic acid, alkenylsuccinic acid, fumaric acid, and mesaconic acid; α, β-unsaturated acids such as acrylic acid, methacrylic acid, crotonic acid, cinnamic acid; vinyl monomers including a carboxy group such as acid anhydrides of these acids.

When a compound including a carboxy group includes a vinyl resin, a method for including a carboxy group in the vinyl resin is not particularly limited, and a known method can be used. For example, it is preferable to use a vinyl-based monomer including a carboxy group such as acrylic acid and methacrylic acid.

The vinyl resin is preferably a polymer of a styrene-based monomer, a vinyl-based monomer including a carboxy group, and at least one selected from the group consisting of acrylic acid esters and methacrylic acid esters.

Compound Having Amino Group and Alkoxysilyl Group

The compound having an amino group and an alkoxysilyl group is not particularly limited, but for example, at least one selected from the group consisting of compounds represented by the following formulas (1) to (3) can be used.

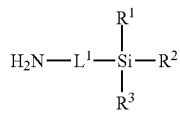

(1)

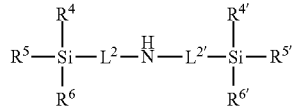

(2)

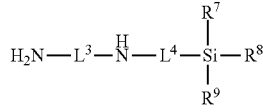

(3)

In the formula (1), $R^1$ to $R^3$ each independently represent an alkyl group, an alkoxy group or an aryl group, provided that at least one of $R^1$ to $R^3$ represents an alkoxy group; and $L^1$ represents a single bond, an alkylene group, or a phenylene group.

In the formula (2), $R^4$ to $R^6$ and $R^{4'}$ to $R^{6'}$ each independently represent an alkyl group, an alkoxy group or an aryl group, provided that at least one of $R^4$ to $R^6$ and $R^{4'}$ to $R^{6'}$ represents an alkoxy group; and $L^2$ and $L^{2'}$ each independently represent a single bond, an alkylene group, or a phenylene group.

In the formula (3), $R^7$ to $R^9$ each independently represent an alkyl group, an alkoxy group or an aryl group, provided that at least one of $R^7$ to $R^9$ represents an alkoxy group; $L^3$ represents an alkylene group or a phenylene group; and $L^4$ represents a single bond, an alkylene group, or a phenylene group.

The alkyl group (preferably having 1 to 4 carbon atoms) in $R^1$ to $R^9$ and $R^{4'}$ to $R^{6'}$ in the formulas (1) to (3) is not particularly limited, but may be a methyl group, an ethyl group, a propyl group, or the like. Preferred is a methyl group.

The alkoxy group (preferably having 1 to 4 carbon atoms) in $R^1$ to $R^9$ and $R^{4'}$ to $R^{6'}$ in the formulas (1) to (3) is not particularly limited, but may be a methoxy group and an ethoxy group, a propoxy group, an isopropoxy group, and the like. Preferred is a methoxy group or an ethoxy group.

The aryl group (preferably having 6 to 12 carbon atoms) in $R^1$ to $R^9$ and $R^{4'}$ to $R^{6'}$ in the formulas (1) to (3) is not particularly limited, but may be a phenyl group, a naphthyl group, and the like. Preferred is a phenyl group.

The alkylene group (preferably having 1 to 12 carbon atoms, more preferably 1 to 4 carbon atoms, and still more preferably 1 to 3 carbon atoms) in $L^1$ to $L^4$ and $L^{2'}$ is exemplified by the following groups. A methylene group, an ethylene group, a trimethylene group, a propylene group, a tetramethylene group, a hexamethylene group, a neopentylene group, a heptamethylene group, an octamethylene group, a nonamethylene group, a decamethylene group, a undecamethylene group, a dodecamethylene group, a 1,3-cyclopentylene group, a 1,3-cyclohexylene group, and a 1,4-cyclohexylene group.

The amount of the compound having an amino group and an alkoxysilyl group is preferably 0.1 part by mass or more with respect to 100 parts by mass of the compound including a carboxy group, and from the viewpoint of improving reactivity, this amount is more preferably 1.0 part by mass or more. Meanwhile, from the viewpoint of cost efficiency, this amount is preferably 100.0 parts by mass or less, and more preferably 50.0 parts by mass or less.

EXAMPLES

Hereinafter, the present invention will be specifically described with reference to examples, but the present invention is not limited to these examples. Unless otherwise specified, "parts" of each material in the examples and comparative examples are all based on mass.

The characteristic values and the like described in this specification were obtained by the following evaluation methods.

Method for Measuring pH

A suitable amount of a reaction solution is taken 1 min after the addition of DMT-MM (start of the amidation reaction), the reaction solution is diluted 10 times by volume with pure water, and the pH is measured upon mixing. Where the reaction solution is not mixed with pure water, pH is measured after stirring for about 1 min. A portable pH meter (product name: LAQUIA, manufactured by HORIBA, Ltd.) is used for the measurement.

Method for Measuring Amidation Reaction Rate

The reaction solution during the amidation reaction is sampled with time, and the sample at each time is analyzed by gas chromatography. The peak of the compound remaining in the reaction solution and having an amino group and an alkoxysilyl group is quantified, and the reaction rate (reduction amount of the compound having an amino group and an alkoxysilyl group; %/min) is calculated by the following formula.

$$\text{Reaction rate (\%/min)} = 100 \times (1 - b/a)/20$$

(a) Peak quantitative value of the compound having an amino group and an alkoxysilyl group at the initial stage (before adding the amidating agent) . . . a (b) Peak quantitative value of the compound having an amino group and an alkoxysilyl group at the latter stage (20 minutes after the start of the reaction) . . . b Gas chromatography measurement conditions are as follows.

Measuring device: 7890B (manufactured by Agilent Technologies, Inc.)
Column: HP-INNOWAX (manufactured by Agilent Technologies, Inc.), 50 m×0.20 mm×0.40 μm
Carrier gas: helium
Carrier gas flow rate: 0.9 ml/min
Detector: FID
Inlet temperature: 250° C.
Detector temperature: 250° C.
Heating pattern (column): holding at 50° C. for 10 min, heating up to 250° C. at 5° C./min
Split ratio: 50
Sample: 0.5 μL, The evaluation criteria are as follows.
A: 4.5 (%/min) or more
B: 3.0 (%/min) or more and less than 4.5 (%/min)
C: 1.5 (%/min) or more and less than 3.0 (%/min)
D: 0.5 (%/min) or more and less than 1.5 (%/min)
E: less than 0.5 (%/min)

Method for Measuring Hydrolysis Amount of Alkoxy Groups

The reaction solution after completion of the amidation reaction is sampled, and the peak of alcohol which is a product of hydrolysis of the alkoxy groups is quantified by gas chromatography analysis. In addition, in order to quantify the amount of alcohol at the time of complete hydrolysis, a sample obtained by adjusting the pH of the above-mentioned sample to 1.5 and stirring for 3 h was similarly subjected to gas chromatography analysis to determine the peak of the contained alcohol.

The hydrolysis amount of the alkoxy groups is calculated by the following formula.

$$\text{Hydrolysis amount (\%)} = 100 \times d/c$$

(c) Peak quantitative value of alcohol at the time of complete hydrolysis . . . c
(d) Peak quantitative value of alcohol in the reaction solution . . . d The conditions for gas chromatography analysis are the same as those described above.

The evaluation criteria are in the following manner.
A: less than 5.0(%)
B: 5.0(%) or more and less than 30.0(%)
C: 30.0(%) or more and less than 60.0(%)
D: 60.0(%) or more and less than 90.0(%)
E: 90.0(%) or more Method for Measuring Purity When side reactions occur in Examples and Comparative Examples, the purity decreases. The purity is measured in the following manner.

Using a nuclear magnetic resonance analyzer (solid-state $^1$H-NMR: ECP600, manufactured by JEOL RESONANCE Inc.), the residue on a filter paper including the silane modified compound obtained in Examples and Comparative Examples is measured as a solid sample. Depth2 is used for the measurement method, and the measurement conditions are: a pulse width of 2.3 μsec, a waiting time for pulse repetition of 15 sec, an integration count of 16 scan, and a MAS rotation speed of 22 KHz. The standard of chemical shift is a peak derived from adamantane at 1.7 ppm.

Among the obtained peaks, the value obtained by adding the integrated values of all the peaks derived from the target substance among the peaks newly appearing due to the amidation reaction, as compared with the compound including a carboxy group as a raw material, is taken as X1 (quantitative value of the peak derived from the target substance). In addition, where the integrated value of all the peaks not derived from the target substance among the peaks newly appearing due to the amidation reaction, as compared with the compound including a carboxy group as a raw material, is taken as X2 (quantitative peak derived from impurities), the purity is calculated by the following formula.

$$\text{Purity (\%)} = 100 \times [X1/(X1+X2)]$$

The evaluation criteria are as follows.
A: 90.0(%) or more
B: 70.0(%) or more and less than 90.0(%)
C: 50.0(%) or more and less than 70.0(%)
D: 30.0(%) or more and less than 50.0(%)
E: less than 30.0(%)

Measurement of Weight Average Molecular Weight Mw

The weight average molecular weight Mw of a sample such as a compound including a carboxy group is measured by gel permeation chromatography (GPC) in the following manner.

First, the sample is dissolved in tetrahydrofuran (THF) at room temperature for 24 h. Then, the obtained solution is filtered through a solvent-resistant membrane filter "Mysyori Disc" (manufactured by Tosoh Corporation) having a pore diameter of 0.2 μm to obtain a sample solution. The sample solution is prepared so that the concentration of the components soluble in THF is about 0.8% by mass. Using this sample solution, measurement is performed under the following conditions. Device: HLC8120 GPC (detector: RI) (manufactured by Tosoh Corporation) Column: seven columns of Shodex KF-801, 802, 803, 804, 805, 806, and 807 (manufactured by Showa Denko KK)
Eluent: tetrahydrofuran (THF)
Flow rate: 1.0 mL/min
Oven temperature: 40.0° C.
Sample injection volume: 0.10 mL In calculating the molecular weight of the sample, a molecular weight calibration curve created using a standard polystyrene resin (trade name "TSK Standard Polystyrene F-850, F-450, F-288, F-128, F-80, F-40, F-20, F-10, F-4, F-2, F-1, A-5000, A-2500, A-1000, A-500", manufactured by Tosoh Corporation) is used.

Measurement of Acid Value

The acid value is the number of milligrams of potassium hydroxide required to neutralize the acid contained in 1 g of the sample. The acid value of the resin is measured according to JIS K 0070-1992. Specifically, the acid value is measured according to the following procedure.

(1) Preparation of reagent

A total of 1.0 g of phenolphthalein is dissolved in 90 mL of ethyl alcohol (95% by volume), and ion exchanged water is added to make 100 mL and obtain a phenolphthalein solution.

A total of 7 g of special grade potassium hydroxide is dissolved in 5 mL of water and ethyl alcohol (95% by volume) is added to make 1 L. The solution is placed in an alkali-resistant container and allowed to stand for 3 days so as not to be exposed to carbon dioxide gas and the like, and then filtered to obtain a potassium hydroxide solution. The obtained potassium hydroxide solution is stored in an alkali-resistant container.

A total of 25 mL of 0.1 mol/L hydrochloric acid is placed in an Erlenmeyer flask, several drops of the phenolphthalein solution are added, titration is performed with the potassium hydroxide solution, and the factor of the potassium hydroxide solution is determined from the amount of the potassium hydroxide solution required for neutralization. The 0.1 mol/L hydrochloric acid prepared according to JIS K 8001-1998 is used.

(2) Operation (A) Main test

A total of 2.0 g of sample is precisely weighed in a 200 ml Erlenmeyer flask, 100 ml of a mixed solution of toluene/ethanol (2:1) is added, and dissolution is performed for 5 h. Next, several drops of the phenolphthalein solution are added as an indicator, and titration is performed using the potassium hydroxide solution. The end point of the titration is when the light red color of the indicator continues for about 30 sec.

(B) Blank test

The same titration as in the above procedure is performed except that no sample is used (that is, only a mixed solution of toluene/ethanol (2:1) is used).

(3) The obtained result is substituted into the following equation to calculate the acid value.

$$A=[(C-B) \times f \times 5.61]/S$$

Here, A: acid value (mg KOH/g), B: addition amount (ml) of the potassium hydroxide solution in the blank test, C: addition amount (ml) of the potassium hydroxide solution in the main test, f: potassium hydroxide solution factor, and S: mass (g) of the sample.

<Synthesis of Polyester (A-1)>

Polyester (A-1) was synthesized by the following procedure.

The following materials were loaded into an autoclave equipped with a decompression device, a water separation device, a nitrogen gas introduction device, a temperature measurement device, and a stirring device, and the reaction was conducted at 200° C. for 5 h under a nitrogen atmosphere at normal pressure.

| | |
|---|---|
| Bisphenol A - propylene oxide 2.1 mol adduct: | 39.6 parts |
| Terephthalic acid: | 8.0 parts |
| Isophthalic acid: | 7.6 parts |
| Tetrabutoxytitanate: | 0.1 part |

Thereafter, 0.01 parts of trimellitic acid and 0.12 parts of tetrabutoxytitanate were added, reacted at 220° C. for 3 h, and further reacted under reduced pressure of 10 mmHg to 20 mmHg for 2 h to obtain a polyester (A-1).

The obtained polyester (A-1) had an acid value of 6.1 mg KOH/g, and Mw=10200.

<Synthesis of Polyester (A-2)>

A polyester (A-2) was obtained in the same manner as in the synthesis of the polyester (A-1), except that 39.6 parts of a bisphenol A—propylene oxide 2.1 mol adduct was replaced with 33.2 parts of a bisphenol A—ethylene oxide 2 mol adduct.

The obtained polyester (A-2) had an acid value of 10.8 mg KOH/g, and Mw=2800.

<Synthesis of Polyester (A-3)>

A polyester (A-3) was synthesized by the following procedure.

The following materials were loaded into an autoclave equipped with a decompression device, a water separation device, a nitrogen gas introduction device, a temperature measurement device, and a stirring device, and the reaction was conducted at 200° C. for 5 h under a nitrogen atmosphere at normal pressure.

| | |
|---|---|
| Bisphenol A - propylene oxide 2 mol adduct: | 21.0 parts |
| Ethylene glycol: | 2.1 parts |
| Isosorbide: | 0.6 parts |
| Terephthalic acid: | 14.8 parts |
| Tetrabutoxytitanate: | 0.1 part |

Thereafter, 1.1 parts of trimellitic acid and 0.1 part of tetrabutoxytitanate were added, reacted at 220° C. for 3 h, and further reacted under reduced pressure of 10 mmHg to 20 mmHg for 2 h to obtain a polyester (A-3).

The obtained polyester (A-3) had an acid value of 6.0 mg KOH/g, and Mw of 10400.

<Synthesis of Styrene Acrylic Resin (A-4)>

A styrene acrylic resin (A-4) was synthesized in the following manner.

A total of 100.0 parts of propylene glycol monomethyl ether was heated while replacing with nitrogen, and refluxed at a liquid temperature of 120° C. or higher. Thereto, 80.2 parts of styrene, 20.1 parts of butyl acrylate, 5.0 parts of acrylic acid, and 0.2 parts of tert-butyl peroxybenzoate [organic peroxide-based polymerization initiator, manufactured by NOF Corporation, trade name: PERBUTYL Z] were added dropwise over 3 h.

After completion of the dropwise addition, the solution was stirred for 3 h, and then distilled under normal pressure while increasing the temperature of the solution to 170° C. After the liquid temperature reached 170° C., the pressure was reduced to 1 hPa, and the solvent was removed by distillation over 1 h to obtain a resin solid matter. The resin solid matter was dissolved in tetrahydrofuran and reprecipitated with n-hexane, and the precipitated solid matter was separated by filtration to obtain a styrene acrylic resin (A-4).

The acid value of the obtained styrene acrylic resin (A-4) was 36.2 mg KOH/g and Mw=99600.

Synthesis of Low-Molecular Compound (A-5)

A compound (low-molecular) including a carboxy group which is described in Japanese Patent Application Publication No. 2015-140397 was synthesized in the following manner.

A mixed solution of 14.3 parts of p-hydroxybenzoic acid, 25.0 parts of triethylamine and tetrahydrofuran was cooled on ice, 11.0 parts of 2-bromoisobutyryl bromide was added thereto, and the reaction solution was stirred for 3 h while raising the temperature from 0° C. to room temperature.

After the solution was concentrated, the obtained liquid was diluted with 100 ml of ethyl acetate, and washed with a 1 mol/L aqueous solution of hydrochloric acid. After concentrating the organic layer, water was added, and a 1 mol/L aqueous solution of hydrochloric acid was added dropwise to obtain, by recrystallization, a low-molecular compound (A-5) represented by the following formula.

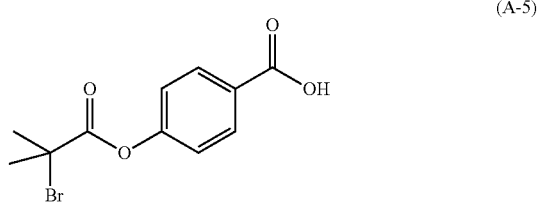 [SMILES: CC(C)(Br)C(=O)Oc1ccc(C(=O)O)cc1]

(A-5)

Synthesis and Evaluation of Polymer-type Silane Modified Compound Example 1

The carboxy group in the polyester (A-1) and the amino group in the aminosilane were amidated to synthesize a silane modified compound (R-1) (a compound having an amide bond and also having an alkoxysilyl group) in the following manner.

A total of 50.0 parts of the polyester (A-1) was dissolved in 200.0 parts of N,N-dimethylacetamide, 1.7 parts of triethylamine, 1.2 parts of 3-aminopropyltriethoxysilane, and 1.7 part of DMT-MM (4-(4,6-dimethoxy-1,3,5-triazin-2-yl)-4-methylmorpholinium chloride) as a condensing agent were added, and the mixture was stirred for 5 h. After completion of the reaction, the solution was dropped into methanol, reprecipitated, and filtered to obtain a silane modified compound (R-1) (the residue on the filter paper obtained here was taken as a sample for the above-described measurement of purity).

Table 5 shows the pH during the reaction and the properties of the obtained silane modified compound (R-1).

Examples 2 to 4

Silane modified compounds (R-2) to (R-4) were obtained in the same manner as in Example 1, except that the polyester (A-1), the amount of triethylamine, the amount of 3-aminopropyltriethoxysilane, and the amount of DMT-MM were changed as shown in Table 1 below.

Table 5 shows the pH and physical properties during the reaction.

TABLE 1

| | Compound | | Addition amount (parts) | | |
|---|---|---|---|---|---|
| | Silane modified compound | including carboxy group | 3-aminopropyl triethoxysilane | DMT-MM | Triethylamine |
| Example 1 | R-1 | A-1 | 1.2 | 1.7 | 1.7 |
| Example 2 | R-2 | A-2 | 2.1 | 2.9 | 2.9 |
| Example 3 | R-3 | A-3 | 1.2 | 1.6 | 1.6 |
| Example 4 | R-4 | A-4 | 7.1 | 9.8 | 9.8 |

Examples 5 to 11

Silane modified compounds (R-5) to (R-11) were synthesized in the same manner as in Example 1, except that N,N-dimethylacetamide was changed as shown in Table 2 below. When the solvent was dimethyl sulfoxide or ethyl acetate, the solution was turbid, and when ethanol was used, a suspension rather than a solution was obtained.

Table 5 shows the pH and physical properties during the reaction.

TABLE 2

| | Silane modified compound | Solvent |
|---|---|---|
| Example 1 | R-1 | N,N-dimethylacetamide |
| Example 5 | R-5 | N,N-dimethylformamide |
| Example 6 | R-6 | Tetrahydrofuran |
| Example 7 | R-7 | Acetone |
| Example 8 | R-8 | N-methyl-2-pyrrolidone |
| Example 9 | R-9 | Dimethyl sulfoxide |
| Example 10 | R-10 | Ethyl acetate |
| Example 11 | R-11 | Ethanol |

Examples 12 to 20

Silane modified compounds (R-12) to (R-20) were synthesized in the same manner as in Example 1, except that 1.7 parts of triethylamine was changed to the types and amounts of bases shown in Table 3. Table 3 shows the pH during the reaction.

Physical properties are shown in Table 5.

TABLE 3

| | Silane modified compound | Base Type | Addition amount (parts) | pH of reaction solution |
|---|---|---|---|---|
| Example 1 | R-1 | Triethylamine | 1.7 | 9.5 |
| Example 12 | R-12 | 4-dimethylaminopyridine | 2.0 | 10.4 |
| Example 13 | R-13 | Triethanolamine | 2.4 | 9.3 |
| Example 14 | R-14 | Diisopropylethylamine | 2.1 | 9.8 |
| Example 15 | R-15 | Pyridine | 1.3 | 8.2 |
| Example 16 | R-16 | Trimethylamine (13% tetrahydrofuran solution) | 7.4 | 8.5 |
| Example 17 | R-17 | Aqueous ammonia (28%) | 1.0 | 8.3 |
| Example 18 | R-18 | Aqueous solution of sodium hydroxide (20%) | 0.3 | 11.5 |
| Example 19 | R-19 | Triethylamine | 0.6 | 7.5 |
| Example 20 | R-20 | Aqueous solution of sodium hydroxide (20%) | 0.4 | 12.5 |

Examples 21 to 24

Silane modified compounds (R-21) to (R-24) were synthesized in the same manner as in Example 1, except that 1.2 parts of 3-aminopropyltriethoxysilane was changed to the types and amounts of the compounds having an amino group and an alkoxysilyl group shown in Table 4.

Table 5 shows the pH and physical properties during the reaction.

TABLE 4

| | Silane modified compound | Compound having amino group and alkoxysilyl group Type | Addition amount (parts) |
|---|---|---|---|
| Example 1 | R-1 | 3-aminopropyltriethoxysilane | 1.2 |
| Example 21 | R-21 | 3-aminopropyldimethylethoxysilane | 0.9 |
| Example 22 | R-22 | Aminophenyltrimethoxysilane | 1.2 |
| Example 23 | R-23 | Bis[3-(trimethoxysilyl)propyl]amine | 1.9 |
| Example 24 | R-24 | 3-(2-aminoethylamino)propyltrimethoxysilane | 1.2 |

Comparative Example 1

A silane modified compound (CR-1) was obtained in the same manner as in Example 1, except that triethylamine was not used.

Table 5 shows the pH and physical properties during the reaction.

Comparative Example 2

A silane modified compound (CR-2) was obtained in the same manner as in Example 1, except that 1.7 parts of DMT-MM was replaced with 5.2 parts of EDC [1-ethyl-3-(3-dimethylaminopropyl) carbodiimide hydrochloride], and no triethylamine was used.

Table 5 shows the pH and physical properties during the reaction.

Comparative Example 3

A silane modified compound (CR-3) was obtained in the same manner as in Example 1, except that 1.7 parts of DMT-MM was replaced with 5.2 parts of EDC [1-ethyl-3-(3-dimethyl aminopropyl) carbodiimide hydrochloride].

Table 5 shows the pH and physical properties during the reaction.

Synthesis and Evaluation of Low-Molecular Silane Modified Compound Example 25

A total of 10.0 parts of propiolic acid was dissolved in 190.0 parts of N,N-dimethylacetamide, then 14.5 parts of triethylamine, 31.6 parts of 3-aminopropyltriethoxysilane, and 39.5 parts of DMT-MM (4-(4,6-dimethoxy-1,3,5-triazin-2-yl)-4-methylmorpholinium chloride) were added, and the mixture was stirred for 5 h. After completion of the reaction, the solution was dropped into methanol, reprecipitated, and filtered to obtain a silane modified compound (R-25).

Table 7 shows the pH and physical properties during the reaction.

Examples 26 and 27

Silane modified compounds (R-26) and (R-27) were obtained in the same manner as in Example 25, except that propiolic acid was replaced with each of the compounds including a carboxy group in Table 6, and the addition amounts of triethylamine, 3-aminopropyltriethoxysilane, and DMT-MM were changed to the addition amounts described in Table 6.

Table 7 shows the pH and physical properties during the reaction.

TABLE 5

| | Evaluation results (polymer-type silane modified compound) | | | | | | |
|---|---|---|---|---|---|---|---|
| | Silane modified compound | Hydrolysis amount of alkoxy group | | Purity | | Amidation reaction rate | | pH of reaction solution |
| | | % | Rank A~E | % | Rank A~E | %/min | Rank A~E | |
| Example 1 | R-1 | 1.1 | A | 95.8 | A | 4.5 | A | 9.5 |
| Example 2 | R-2 | 1.5 | A | 94.8 | A | 4.7 | A | 9.2 |
| Example 3 | R-3 | 1.8 | A | 98.3 | A | 4.9 | A | 9.5 |
| Example 4 | R-4 | 4.9 | A | 90.7 | A | 4.5 | A | 9.0 |
| Example 5 | R-5 | 2.1 | A | 94.7 | A | 4.6 | A | 9.1 |
| Example 6 | R-6 | 3.5 | A | 96.2 | A | 4.5 | A | 9.5 |
| Example 7 | R-7 | 3.1 | A | 95.1 | A | 4.5 | A | 8.7 |
| Example 8 | R-8 | 2.4 | A | 94.8 | A | 4.6 | A | 8.8 |
| Example 9 | R-9 | 3.4 | A | 63.7 | C | 4.7 | A | 9.1 |
| Example 10 | R-10 | 4.2 | A | 53.8 | C | 1.6 | C | 9.0 |
| Example 11 | R-11 | 1.2 | A | 90.3 | A | 0.6 | D | 10.7 |
| Example 12 | R-12 | 1.7 | A | 93.6 | A | 4.7 | A | 10.4 |
| Example 13 | R-13 | 3.5 | A | 94.2 | A | 4.6 | A | 9.3 |
| Example 14 | R-14 | 4.7 | A | 93.3 | A | 3.5 | B | 9.8 |
| Example 15 | R-15 | 17.5 | B | 81.2 | B | 4.1 | B | 8.2 |
| Example 16 | R-16 | 20.3 | B | 75.3 | B | 3.3 | B | 8.5 |
| Example 17 | R-17 | 24.6 | B | 74.1 | B | 4.0 | B | 8.3 |
| Example 18 | R-18 | 33.1 | C | 71.8 | B | 4.1 | B | 11.5 |
| Example 19 | R-19 | 4.7 | A | 86.3 | B | 1.8 | C | 7.5 |
| Example 20 | R-20 | 68.5 | D | 57.9 | C | 4.1 | B | 12.5 |
| Example 21 | R-21 | 1.7 | A | 94.7 | A | 4.6 | A | 8.1 |
| Example 22 | R-22 | 2.3 | A | 76.7 | B | 3.4 | B | 9.3 |
| Example 23 | R-23 | 2.1 | A | 87.3 | B | 3.3 | B | 9.5 |
| Example 24 | R-24 | 3.5 | A | 71.6 | B | 3.1 | B | 9.7 |
| Comparative Example 1 | CR-1 | 92.7 | E | 54.1 | C | 0.3 | E | 5.5 |
| Comparative Example 2 | CR-2 | 91.8 | E | 21.4 | E | 0.4 | E | 5.1 |
| Comparative Example 3 | CR-3 | 97.3 | E | 45.6 | D | 1.6 | C | 8.5 |

TABLE 6

| | Silane modified compound | Compound including carboxy group | Addition amount (parts) | | |
| --- | --- | --- | --- | --- | --- |
| | | | 3-aminopropyl triethoxysilane | DMT-MM | Triethylamine |
| Example 25 | R-25 | Propiolic acid | 31.6 | 39.5 | 14.5 |
| Example 26 | R-26 | 4-tert-butylbenzoic acid | 12.4 | 15.5 | 5.7 |
| Example 27 | R-27 | A-5 | 7.7 | 9.6 | 3.5 |

Comparative Example 4

Comparative Example 4 is referred to paragraph [0018] of Chinese Patent Application Publication No. 103881107.

A silane modified compound (CR-4) was obtained in the same manner as in Example 25, except that triethylamine was not used and 39.5 parts of DMT-MM was changed to 88.4 parts of N,N-dicyclohexylcarbodiimide (DCC).

Table 7 shows the pH and physical properties during the reaction.

Comparative Example 5

Comparative Example 5 is referred to paragraph [0291] of Japanese Patent Application Publication No. 2017-58598.

A silane modified compound (CR-5) was obtained in the same manner as in Example 26, except that 5.7 parts of triethylamine was changed to 6.9 parts of 4-dimethylaminopyridine (DMAP), and 15.5 parts of DMT-MM was changed to 53.8 parts of 1-ethyl-3-(3-dimethylaminopropyl)carbodiimide hydrochloride (EDC).

Table 7 shows the pH and physical properties during the reaction.

Comparative Example 6

Comparative Example 6 is referred to paragraph [0060] of Japanese Patent Application Publication No. 2015-140397.

A silane modified compound (CR-6) was obtained in the same manner as in Example 27, except that triethylamine was not used.

Table 7 shows the pH and physical properties during the reaction.

Comparative Example 7

A silane modified compound (CR-7) was obtained in the same manner as in Comparative Example 6, except that the solvent amount of N,N-dimethylacetamide was changed from 190.0 parts to 40.0 parts.

Table 7 shows the pH and physical properties during the reaction.

TABLE 7

| | | Evaluation results (low-molecular-type silane modified compound) | | | | | | |
| --- | --- | --- | --- | --- | --- | --- | --- | --- |
| | Silane modified compound | Hydrolysis amount of alkoxy group | | Purity | | Amidation reaction rate | | pH of reaction solution |
| | | % | Rank A~E | % | Rank A~E | %/min | Rank A~E | |
| Example 25 | R-25 | 1.4 | A | 97.2 | A | 4.6 | A | 9.5 |
| Example 26 | R-26 | 3.6 | A | 95.3 | A | 4.7 | A | 9.3 |
| Example 27 | R-27 | 3.1 | A | 94.8 | A | 4.6 | A | 9.2 |
| Comparative Example 4 | CR-4 | 76.0 | D | 32.1 | D | 1.5 | C | 5.0 |
| Comparative Example 5 | CR-5 | 65.5 | D | 53.4 | C | 2.4 | C | 11.2 |
| Comparative Example 6 | CR-6 | 68.2 | D | 64.8 | C | 1.8 | C | 4.9 |
| Comparative Example 7 | CR-7 | 69.3 | D | 24.3 | E | 0.8 | D | 5.2 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-083949, filed Apr. 25, 2019, which is hereby incorporated by reference herein in its entirety.

What is claimed is:

1. A production method for obtaining a compound having an amide bond and also having an alkoxysilyl group by a reaction of a compound including a carboxy group with a compound having an amino group and an alkoxysilyl group, the production method comprising:
   a step of conducting the reaction using a triazine-based amidating agent under a basic condition in the presence of a tertiary amine,
   wherein the tertiary amine comprises at least one selected from the group consisting of triethylamine, 4-dimethylaminopyridine, triethanolamine, and diisopropylethylamine.

2. The production method according to claim 1, wherein a weight average molecular weight Mw of the compound including the carboxy group is from 3000 to 100000.

3. The production method according to claim 1, wherein the compound including the carboxy group comprises a polyester resin or a vinyl resin.

4. The production method according to claim 1, wherein the compound including the carboxy group comprises a polyester resin.

5. The production method according to claim 1, wherein the compound having the amino group and the alkoxysilyl group comprises at least one selected from the group consisting of compounds represented by formulas (1) to (3):

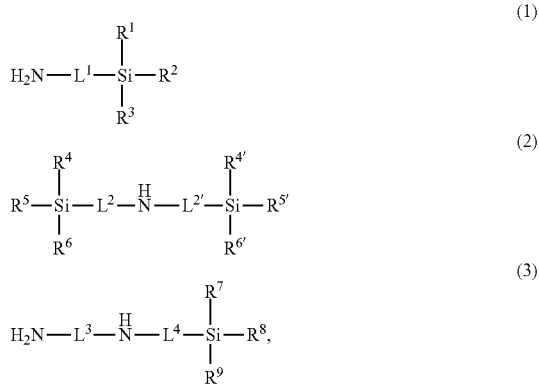

wherein, in the formula (1), $R^1$ to $R^3$ each independently represent an alkyl group, an alkoxy group or an aryl group, provided that at least one of $R^1$ to $R^3$ represents an alkoxy group; and $L^1$ represents a single bond, an alkylene group, or a phenylene group, wherein, in the formula (2), $R^4$ to $R^6$ and $R^{4'}$ to $R^{6'}$ each independently represent an alkyl group, an alkoxy group or an aryl group, provided that at least one of $R^4$ to $R^6$ and $R^{4'}$ to $R^{6'}$ represents an alkoxy group; and $L^2$ and $L^{2'}$ each independently represent a single bond, an alkylene group, or a phenylene group, wherein, in the formula (3), $R^7$ to $R^9$ each independently represent an alkyl group, an alkoxy group or an aryl group, provided that at least one of $R^7$ to $R^9$ represents an alkoxy group; $L^3$ represents an alkylene group or a phenylene group; and $L^4$ represents a single bond, an alkylene group, or a phenylene group.

6. The production method according to claim 1, wherein the basic condition is a pH from 8.0 to 13.0.

7. The production method according to claim 1, wherein the triazine-based amidating agent is represented by formula (4):

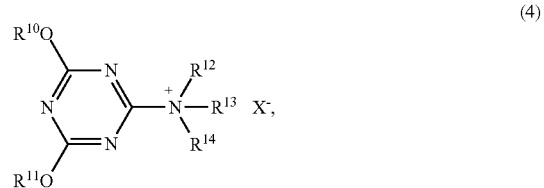

wherein, in the formula (4), $R^{10}$ and $R^{11}$ each independently represent an alkyl group having 1 to 4 carbon atoms or an aryl group having 6 to 8 carbon atoms; one of $R^{12}$, $R^{13}$, and $R^{14}$ represents an alkyl group having 1 to 4 carbon atoms, and remaining two together with a nitrogen atom to which they are bonded form a 5- or 6-membered ring; and X represents a halogen atom.

8. The production method according to claim 7, wherein the triazine-based amidating agent is 4-(4,6-dimethoxy-1,3,5-triazin-2-yl)-4-methylmorpholinium chloride.

* * * * *